United States Patent [19]

Rothe et al.

[11] Patent Number: 5,647,976

[45] Date of Patent: Jul. 15, 1997

[54] HIGH PRESSURE AND TEMPERATURE CELL FOR SOLVENT EXTRACTION

[75] Inventors: Norman J. Rothe, Foster City; Gary L. Gleave, Milpitas, both of Calif.

[73] Assignee: Dionex Corporation, Sunnyvale, Calif.

[21] Appl. No.: 398,144

[22] Filed: Mar. 3, 1995

[51] Int. Cl.$^6$ .................................................. B01D 11/00
[52] U.S. Cl. .......................... 210/137; 210/450; 210/634
[58] Field of Search ................................... 210/634, 541, 210/542, 137, 198.2, 767, 450

[56] References Cited

U.S. PATENT DOCUMENTS

| | | |
|---|---|---|
| 4,554,132 | 11/1985 | Collins . |
| 5,147,551 | 9/1992 | Averette . |
| 5,193,703 | 3/1993 | Staats, III et al. ............ 220/203 |
| 5,198,197 | 3/1993 | Clay . |
| 5,268,103 | 12/1993 | Jameson et al. ................ 210/634 |

FOREIGN PATENT DOCUMENTS

0485668A1  11/1990  European Pat. Off. .

OTHER PUBLICATIONS

Schnitzer, M. et al., "Supercritical Gas Extraction of a Soil with Solvents of Increasing Polarities[1]", *Soil Sci. Soc. Am J.*, vol. 51: 639–646 (1987).

Schnitzer, et al., "Supercritical Gas Extraction of Alkanes and Alkanoic Acids", *Soil Sci. Soc. Am.*, vol. 30: 913–919 (1986).

Schnitzer, et al., "Organic Matter Extraction form Soils with Water at High Pressure and Temperatures", *Soil Sci. Soc. Am J.*, vol. 55: 102–108 (1991).

Nielson, R. et al., "Extraction and Quantitation of Polyolefin Additives", *Journal of Liquid Chromatography*, vol. 41(3): 503–519 (1991).

Freitag, W. et al., "Fast Separation of Stabilizers from Plyolefins by Microwave Heating", *Die Angewandte Makromolekulare Chemie*, 175: 181–185 (1990).

Fernando, L. et al., "Closed–Vessel Microwave dissolution and Comprehensive Analysis of Steel by Direct Current Plasma Atomic Emisson Spectrometry", *Anal. Chem.*, vol. 58: 511–512 (1986).

Fischer, L. et al., "Microwave Dissolution of Geologic Material: Application to Isotope Dilution Analysis", *Anal. Chem.*, vol. 58: 261–263 (1986).

Kingston, H.M. et al., "Microwave Energy for Acid Decomposition at Elevated Temperatures and Pressures using Biological and Botanical Samples", *Anal. Chem.*, vol. 58: 2534–2541 (1986).

Rezaaiyan R. et al., "A Comparison of Mineral Extraction Techniques of Citrus Juices as Analyzed by Inductively Coupled Plasma Atomic Emission Spectrometry", *Journal of Food Science*, vol. 55(5): 1359–1360 (1990).

Nieuwenhuize, J. et al., "Comparison of Microwave and Conventional Extraction Techniques for the Determination of Metals in Soil, Sediment and Sludge Samples by Atomic Spectrometry", *Analyst*, vol. 116: 347–351 (1991).

(List continued on next page.)

*Primary Examiner*—Frank Spear
*Attorney, Agent, or Firm*—Flehr Hohbach Test Albritton & Herbert LLP

[57] ABSTRACT

An extraction cell apparatus (10) for use in elevated pressure and temperature fluid extractions having a pressure resistant vessel (12) forming a cavity (11), and at least one shoulder portion (13) defining an opening (14) communicating with the cavity (11). An insert member (16) is provided engaging the vessel (12) proximate the shoulder portion (13), and a shoulder seal member (17) is positioned proximate the insert member (16). The seal member (17) is positioned for contact with the shoulder portion (13) upon mounting engagement of the insert member (16) with the seal member (17). An end cap (18) is formed for sliding receipt of the insert member (16) therein until an interior surface (19) of the end cap (18) contacts a backside of the seal member (17). An exterior force applied to the end cap (18) in an inwardly direction toward the shoulder portion (13) causing increasing sealing contact between the seal member (17) and the shoulder portion (13).

36 Claims, 5 Drawing Sheets

OTHER PUBLICATIONS

Campbell, M. et al., "High-pressure Microwave Digestion for the Determination of Arsenic, Antimony, Selenium and Mercury of Oily Wastes", *Analyst*, vol. 117: 121–124 (1992).

Ganzler, K. et al., "Effective sample preparation method for extracting biologically active compounds from different matrices by a microwave technique", *Journal of Chromatography*, vol. 520: 257–262 (1990).

Ganzler, K. et al., "A New Method for the Extraction and High–performance Liquid Chromatographic Determination of Vicine and Convicine in Fababeans", *Chromatography*, Pgs. 435–443 (1984).

Mahan, K. et al., "Microwave Digestion Techniques in the Sequential Extraction of Calcium, Iron, Chromium, Manganese, Lead, and Zinc in Segments", *Anal. Chem.*, vol. 59: 938–945 (1987).

Ganzler, K. et al., "Microwave Extraction A Novel Sample Preparation Method for Chromatography", *Journal of Chromatography*, vol. 371: 299–306 (1986).

Hocquellet, P. et al., "Evaluation of Microwave Digestion and Solvent Extraction for the Determination of Trace Amounts of Selenium in Fees and Plant Animal Tissues by Electrothermal Atomic Absorption Spectrometry" *Analyst*, vol. 116: 505–509 (1991).

Capriel, P., et al., "Supercritical Methanol: An Efficacious Technique for the Extraction of Bound Pesticide Residues from Soil and Plant Samples", *J. Agric. Food Chem.*, vol. 34: 70–73 (1986).

Lautenschlaeger, W., "Microwave Digestion in a Closed–Vessel, High–Pressure System", *Spectroscopy International*, vol. 2(2): 18–22 (1990).

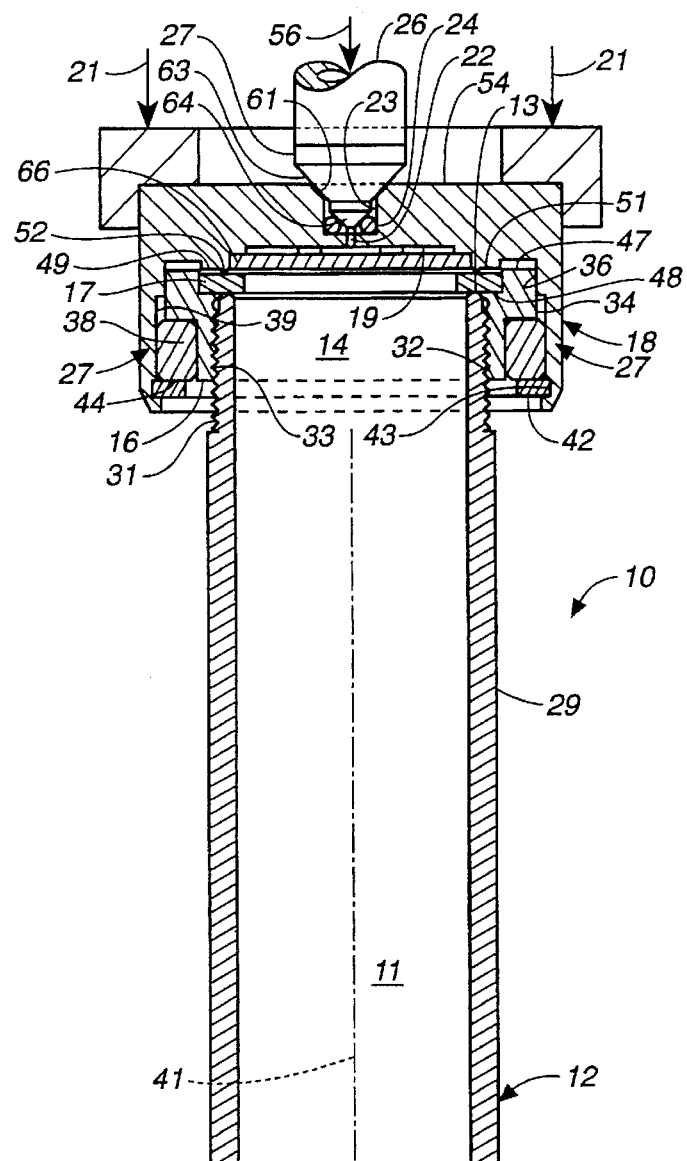
FIG._1

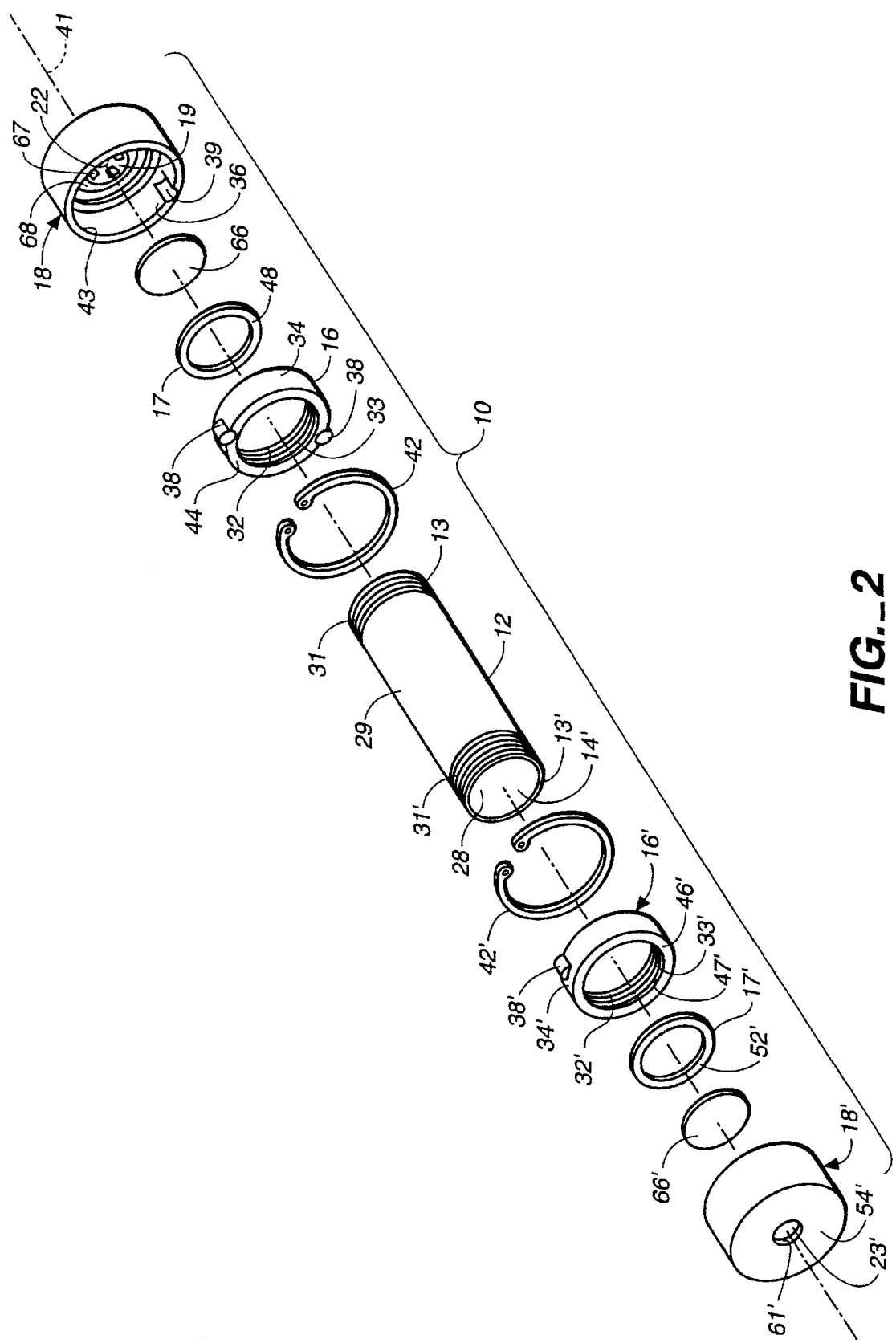
FIG._2

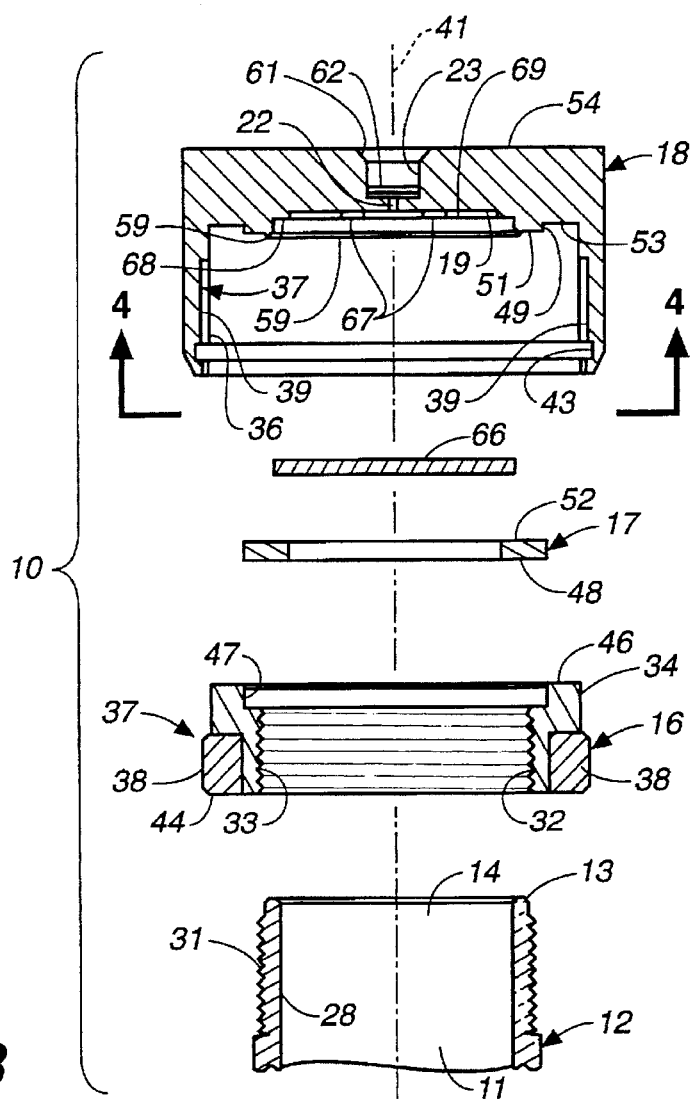
FIG._3
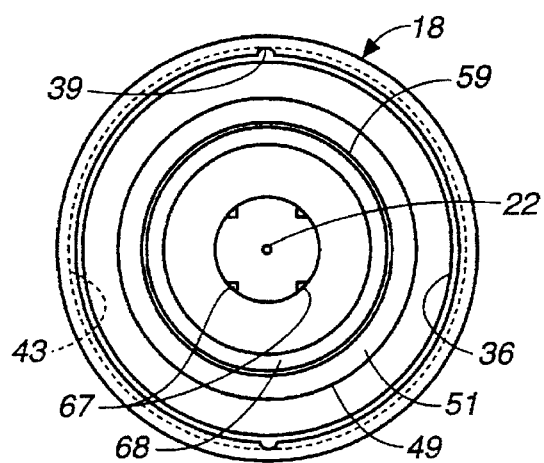
FIG._4

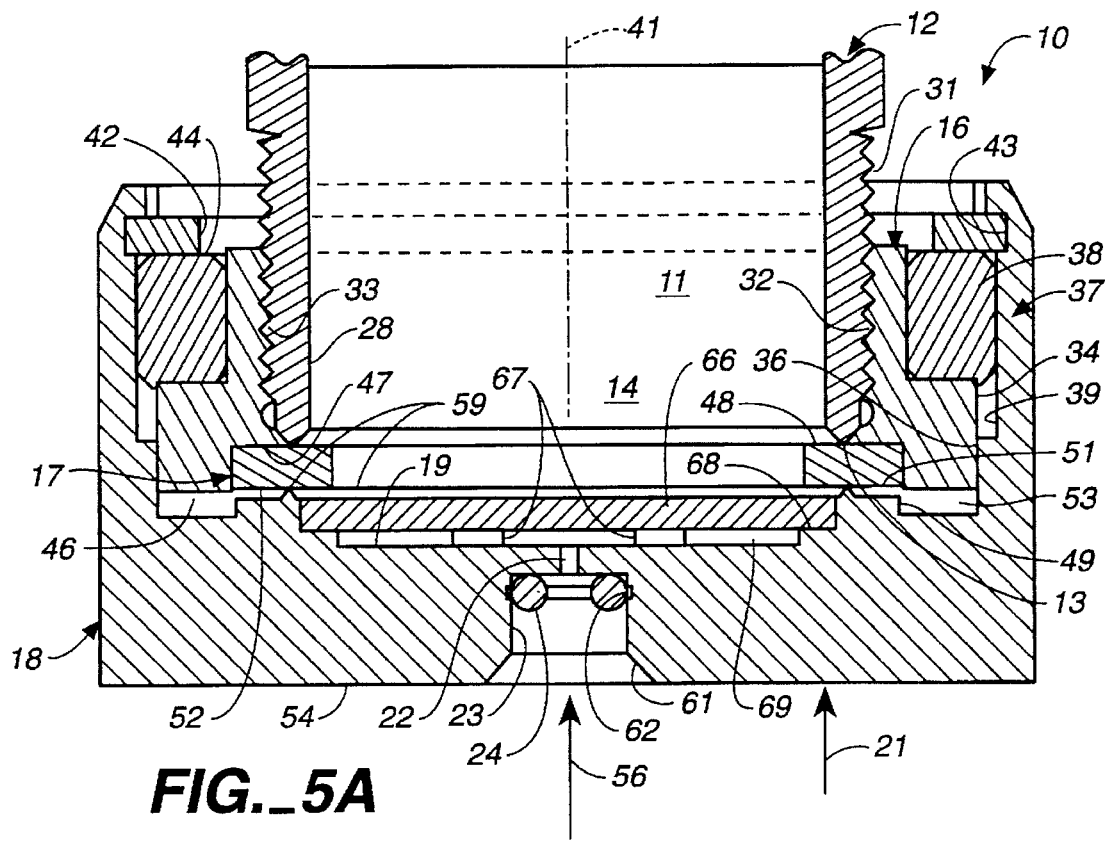
FIG._5A
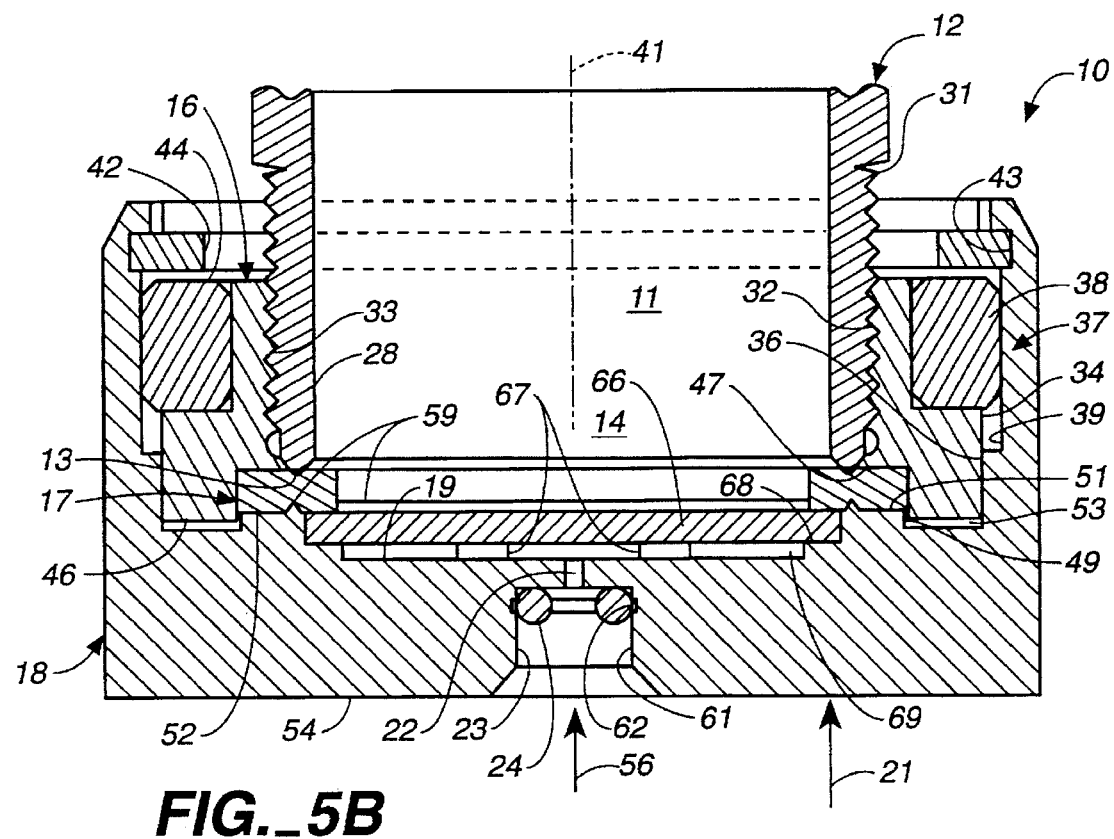
FIG._5B

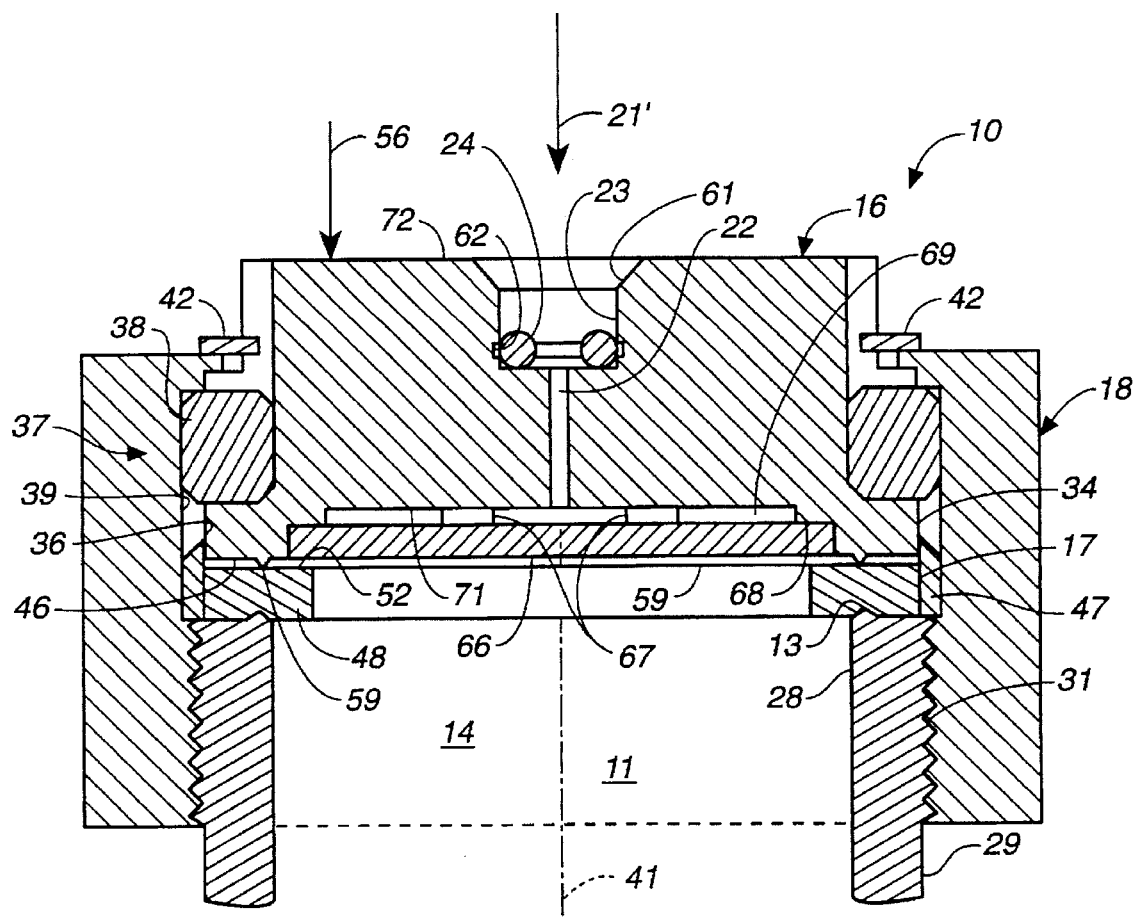
FIG._6

HIGH PRESSURE AND TEMPERATURE CELL FOR SOLVENT EXTRACTION

TECHNICAL FIELD

The present invention relates, generally, to an apparatus for extracting analytes from a sample, and more particularly, relates to an extraction cell apparatus for solvent extraction of organic analytes from a solid matrix sample under elevated temperatures and pressures.

BACKGROUND ART

A number of systems have been used for the extraction and/or removal of compounds and analytes from solid or semi-solid matrices for quantification and identification.

Soxhlet extraction has been in use for over 100 years. In this technique, the extraction of analytes takes place at or close to room temperature, over a period of several hours to several days, and generally uses a large volume of solvent to sample ratio. Fast Soxhlet extractions are also done at the boiling point of the solvent; this system is sold under the tradename "SOXTEC" and is manufactured by Perstorp, Inc. A similar system is marketed under the tradename "SOXTHERM" and is made by ABC Laboratories. For example, an automated Soxhlet extraction technique is used in the Environmental Protection Agency (EPA) method 3541 for the extraction of organic analytes from soil, sediment, sludges and waste solids.

Microwave extraction has also been used, which provides shorter extraction times due to faster heat up times. U.S. Pat. No. 4,554,132 describes an apparatus for the use of microwave for drying the sample combined with solvent extraction at atmospheric pressure in unsealed vessels. Other techniques have been described for the preparation of samples for chromatography, ICP (Inductively Coupled Plasma Emission Spectroscopy) and amino acid analysis (U.S. Pat. No. 4,554,132; P. Hocquellet and M.-P. Candillier, *Analyst*, 116:505–509 (1991); K. Ganzler, A. Salgó and K. Valkó, *J. Chromatography*, 371:299–306 (1986); K. Ganzler, J. Báti and K. Valkó, *Akadémiai Kiadó, Chromatography '84, Budapest, Hungary, H. Kalász and L. S. Ettre, eds.*, pp.435–442 (1984); K. Ganzler, I. Szinai and A. Salgó, *J. Chromatogr.*, 520:257–262 (1990); K. I. Mahan, T. A. Foderaro, T. L. Garza, R. M. Martinez, G. A. Maroney, M. R. Trivisonno and E. M. Willging, *Anal. Chem.*, 59:938–945 (1987)) using microwave extraction in unsealed vessels.

Sealed vessels have also been described (refs 7–13) in conjunction with microwave extractions (L. A. Fernando, W. D. Heavner and C. C. Gabrielli, *Anal. Chem.*, 58:511–512 (1986); L. B. Fischer, *Anal. Chem.*, 58:261–263 (1986); H. M. Kingston and L. B. Jassie, *Anal. Chem.*, 58:2534–2541 (1986); R. Rezaaiyan and S. Nikdel, *J. of Food Science*, 55:1359–1360 (1990); J. Nieuwenhuize, C. H. Poley-Vos, A. H. van den Akker and W. van Delft, *Analyst*, 116:347–351 (1991); M. B. Campbell and G. A. Kanert, *Analyst*, 117:121–124 (1992)). These sealed vessels allow the use of higher pressures and temperatures; for example, reported pressures vary from 40 psi (L. A. Fernando, W. D. Heavner and C. C. Gabrielli, *Anal. Chem.*, 58:511–512 (1986); L. B. Fischer, *Anal. Chem.*, 58:261–263 (1986)) to 3000 psi (W. Lautenschlaeger, *Spectroscopy International*, 2:18–22 (1990)). These systems are utilized to dissolve or digest the sample matrix completely, and typically in large volumes of solvent.

For example, microwave extraction has been used to extract additives and stabilizers from polyolefins (W. Freitag and O. John, *Die Angewandte Makromoiekulare Chemie*, 175:181–85 (1990); R. C. Nielson, *J. Liq. Chromatogr.*, 14:503–519 (1991)). In these examples, the polyolefins are ground and added to an excess of solvent, heated in a microwave, and the solvent containing the analyte is analyzed. In some cases the solvent was evaporated prior to analysis.

U.S. Pat. No. 5,147,551 describes an apparatus used in extraction. A sample is placed in a sealed vessel with a frit. Solvent, which may be heated or unheated, is introduced into the vessel, which may also be heated. After a soak period, an inert gas is swept up through the frit and through the sample to remove the volatile analytes, and then the gas is analyzed, for example on a gas chromatograph.

The extraction of various analytes from a solid matrix samples using a fluid under elevated temperatures and pressures sufficient to cause the fluid to be in a supercritical condition is also well known and has been in use for many years (P. Capriel, A. Haisch and S. U. Kahn, *J. Agric. Food Chem.*, 34:70–73 (1986); M. Schnitzer, C. A. Hindle and M. Meglic, *Soil Sci. Soc. Am. J.*, 50:913–919 (1986); M. Schnitzer and C. M. Preston, *Soil Sci. Soc. Am. J.*, 51:639–646 (1987)). Carbon dioxide, for example, is a commonly employed material for supercritical analyte extraction. The carbon dioxide will be held in a container or cell which is raised to a temperature and pressure which causes the carbon dioxide to operate as a supercritical fluid. While in the supercritical conditions, the fluid is forced through a porous sample to cause extraction of analytes from the sample. A wide range of samples and analytes are amenable to such supercritical extraction techniques.

It also has been found that the addition of a solvent to a supercritical fluid, in relatively low percentages, for example, 10% or less, will enhance the supercritical extraction process. While supercritical fluid extraction, with solvent augmentation, enhances the supercritical fluid extraction result, the temperatures and pressures at which the fluid is maintained in supercritical condition are greater than would be optimum for a pure solvent extraction.

Accordingly, it has been recently discovered that a highly effective solvent extraction process for the extraction of organic analytes from a solid matrix sample can be accomplished by maintaining an organic analyte in contact with a non-aqueous organic solvent system in an extraction cell under temperatures and pressures below supercritical conditions. This process is described in detail in commonly owned U.S. patent application Ser. No. 08/259,667, filed Jun. 14, 1994, and entitled "Accelerated Solvent Extraction System," which application is incorporated herein by reference in its entirety.

In most of the above-mentioned solvent extraction techniques, a container or vessel is required which enables a solvent to flow into the vessel, while maintaining a seal, to contact the analyte. Since the conditions of extraction are often conducted under elevated temperatures and pressures, the seal must adequately perform under a wide range of temperatures and pressures. One such integral high pressure and high temperature seal is disclosed in U.S. Pat. No. 5,193,703 which describes a pressure vessel having a tapered internal sealing surface adapted to receive a tapered mating seal. An outer body portion is formed to engage the vessel, while a sealing body, contained generally within the outer body portion, sealably engages the sealing surface at a distal end thereof. By applying an external force to a proximal end of the sealing body, which then slides relative the outer body portion, the distal end increasingly engages the sealing surface to form a seal.

One problem associated with this design is that the internal seal reduces the overall volume or capacity which the vessel would otherwise be capable of holding. During filling of the vessel, it is usually desirable to top-off the vessel with sample. Because the seal is internal, engagement of the seal against the sealing surface will displace the sample which causes spillage, and more importantly, reduces the internal volume.

Another disadvantage with this design is that the tapered sealing surface and mating tapered seal are not always true to one another. Hence, balancing problems may occur upon which the seal may become wedged against the tapered sealing surface. This ultimately results in separation problems between the tapered sealing surface and the seal.

DISCLOSURE OF INVENTION

Accordingly, it is an object of the present invention to provide a solvent extraction cell apparatus for extracting portions of an analyte contained therein.

Another object of the present invention is to provide a solvent extraction cell apparatus which enables pressurized fluid flow into and from the pressure vessel while maintaining a seal.

Still another object of the present invention is to provide a solvent extraction cell apparatus which repeatedly and accurately maintains its seal integrity under both internal and external elevated pressures and/or temperatures.

Yet another object of the present invention is to provide a solvent extraction cell apparatus which reduces contamination of the solvent caused by multiple cycle extractions.

Another object of the present invention is to provide a solvent extraction cell apparatus which employs enhanced component handling and cell sealing structures that increase operational safety and reduce contamination potential.

It is a further object of the present invention to provide a solvent extraction cell apparatus which is durable, compact, easy to maintain, has a minimum number of components, and is easy to use by unskilled personnel.

In accordance with the foregoing objects, the present invention provides a solvent extraction cell apparatus including a pressure resistant vessel forming a cavity, and having at least one shoulder portion defining an opening communicating with the cavity. An insert member is provided engaging the vessel proximate the shoulder portion for removable mounting thereto, and a seal member positioned proximate the insert member. The seal member has a front side positioned for contact with the shoulder portion upon mounting engagement of the insert member with the seal member. The extraction cell of the present invention further includes an end cap formed for sliding receipt of the insert member therein until an interior surface of the end cap contacts a backside of the seal member such that an exterior force applied to the end cap in an inwardly direction toward the shoulder portion causes increasing sealing contact between the seal member and the shoulder portion.

In another aspect of the present invention, the end cap provides an orifice extending therethrough into the cavity, and a bore portion substantially coaxially aligned with the orifice and extending away from the cavity. The bore portion has a transverse cross-sectional dimension substantially larger than that of the orifice. Further, a deformable nozzle seal member is provided disposed in the bore portion for pressurized fluid passage through the orifice upon a conduit member having a nozzle portion simultaneously engaging the bore portion and the nozzle seal member in a direction towards the orifice to cooperate for pressurized sealing engagement therebetween. The simultaneous engagement further causing sealing engagement between the shoulder portion and the shoulder seal member.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIG. 1 is a fragmentary side elevation view, in cross-section, of the extraction cell apparatus constructed in accordance with the present invention, and having clamping devices apply opposing external forces to the end caps.

FIG. 2 is a reduced, exploded top perspective view of the extraction cell apparatus of FIG. 1.

FIG. 3 is an enlarged, exploded, fragmentary side elevation view, in cross-section, of the extraction cell apparatus of FIG. 2.

FIG. 4 is a bottom plan view of an end cap of the present invention taken substantially along the plane of the line 4—4 in FIG. 3.

FIGS. 5A and 5B are enlarged, fragmentary, side elevation views, in cross-section, of one end of the extraction cell apparatus of FIG. 1 illustrating the displacement of the insert member relative the end cap.

FIG. 6 is a fragmentary side elevation view, in cross-section, of an alternative embodiment of the extraction cell apparatus in which the external forces applied by the clamping devices are applied to the insert member.

BEST MODE OF CARRYING OUT THE INVENTION

While the present invention will be described with reference to a specific embodiment, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIG. 1 where a fluid or solvent extraction cell apparatus, generally designated 10, is illustrated including a pressure resistant vessel or cell body 12 forming a cavity 11. Vessel 12 includes at least one shoulder portion 13 defining an opening 14 communicating with the cavity. An insert member, generally designated 16, is provided engaging vessel 12 proximate shoulder portion 13 for removable mounting thereto. Further, a shoulder seal member 17 is positioned proximate insert member 16 which included a front side positioned for contact with shoulder portion 13 upon mounting engagement of insert member 16 with seal member 17. The extraction cell apparatus 10 of the present invention further includes an end cap, generally designated 18, formed for sliding receipt of insert member 16 therein until an interior surface 19 of end cap 18 contacts a backside of seal member 17 such that an exterior force (illustrated by arrow 21 in FIG. 1) applied to end cap 18 in an inwardly direction toward shoulder portion 13 causes increasing sealing contact between the seal member and the shoulder portion.

In another aspect of the present invention, end cap 18 further provides an orifice 22 extending therethrough into cavity 11 (FIGS. 1, 3, 5A and 5B), and a bore portion 23 substantially coaxially aligned with orifice 22 and extending away from the cavity. Bore portion 23 has a transverse cross-sectional dimension substantially larger than that of orifice 22. Further, a deformable nozzle seal member, generally designated 24, is provided disposed in the bore portion for pressurized fluid passage through orifice 22 when a conduit member 26 having a nozzle 27 simultaneously engages the bore portion and the nozzle seal member in a direction towards the orifice to cooperate for pressurized sealing engagement therebetween. This simultaneous engagement between the conduit nozzle and the nozzle seal and bore portion further causes sealing engagement between the shoulder portion and the shoulder seal member.

Accordingly, the present invention provides a relatively simple extraction cell capable of operational fluid flow into and from the cell under elevated temperatures and pressures. While the extraction cell may be employed in a variety of solvent extraction techniques, including supercritical fluid extraction, the present invention is most preferably operated in combination with the accelerated solvent extraction system disclosed in the above-mentioned commonly owned U.S. patent application.

Moreover, the present invention advantageously seals the pressure vessel at a distal end shoulder portion 13 as opposed to an interior wall of some of the prior art. Accordingly, the cell can be topped off with sample during filling. Further, the present invention is less susceptible to contamination compared to extraction cells which are designed to form a pressurized seal at an exterior surface of the apparatus. These prior art designs often contaminate the contents from substances adhered or contacting the exterior surfaces during handling.

Further, it will be appreciated that while the extraction cell may be operated with only one end incorporating the novel sealing arrangements, or combination thereof, the present invention preferably includes both ends having the end cap, insert member and associated shoulder seal member, together with the orifices and nozzle seal members. For the ease of description, however, only one end of the extraction cell will be described in detail.

Referring now to FIGS. 1–3, it can be viewed that extraction cell apparatus 10 includes a cylindrical cell body 12 having an inner wall 28 forming a substantial portion of cavity 11. Each end of cell body 12 includes an annular shoulder portion 13, 13' which defines an opening 14, 14' into cavity 11. The outer wall 29 at each end of cell body 12 proximate the shoulder portion includes a threaded portion 31, 31'.

In the preferred form, insert member 16 threadably mates with the cell body outer wall 29 through mating threads 32 provided in insert member interior wall 33. This threaded mounting of the insert member to the cell body assures greater safety since a snap-fit type mount could more easily dislodge under the operational interior pressures. As best viewed in FIG. 2, insert member 16 is annular shaped having a substantially smooth exterior wall 34 formed for sliding reciprocation in end cap 18.

End cap 18 is further preferably cylindrical shaped having an inner side wall 36 of a diameter slightly larger than the outer diameter of the insert member exterior wall 34 for sliding movement for relative longitudinal movement therebetween along axis 41 (FIG. 3).

In the preferred embodiment, insert member 16 displaces linearly relative end cap 18 for increased sealing engagement between the shoulder seal member 17 and the shoulder portion 13. Accordingly, a guide device 37 is positioned between insert member and end cap 18 to prevent rotational displacement therebetween. Guide device 37 advantageously enables mating between threaded portion 31 and mating threads 32 of insert member 16 through manual rotational movement of end cap 18 for hand tightening. It will be appreciated, however, that rotational motion is permissible if rotation causes the end cap to displacee relative the insert member along the longitudinal axis 41 or vice-versa.

Guide device 37 includes at least one, but preferably two, equally spaced-apart key members 38 which are slidably received in longitudinally aligned guide slots 39 for movement of the key members along the longitudinal direction of axis 41. Key members 38 are preferably integrally formed or mounted to the insert member, while the mating guide slots 39 are provided in the inner side wall 36 of end cap 18. It will be understood, however, that the key members may be provided by the end cap, while the guide slots are provided by the insert member.

FIGS. 1 and 2 illustrate that a securing device 42, in the form of a retaining ring, secures insert member 16 to end cap 18 while permitting the necessary displacement therebetween. The inner side wall 36 of end cap 18 provides an annular groove 43 formed for retaining receipt of retaining ring 42 at a position snugly secured against one end 44 of insert member 16. Accordingly, displacement of the insert member relative end cap 18 occurs in a direction toward the end cap interior surface to compress shoulder seal member 17 for increased sealing, to be discussed in greater detail below.

In the preferred form, shoulder seal member 17 is to be positioned proximate an opposite end surface 46 of insert member 16 and the interior surface 19 of end cap 18. Shoulder seal member 17 is preferably annular or washer shaped, and is a deformable or compressible seal capable of high pressure and temperature sealing. Preferably, seal member 17 is composed of Polyether-ether ketone (PEEK) or the like which exhibits the desirably sealing properties.

The end surface 46 of insert member 16 includes an annular depression 47 formed and dimensioned for removable mounting and receipt of shoulder seal member 17 therein (FIGS. 2 and 5A, 5B). This permits the seal member to be removably press-fit or snap-fit to the insert member. Depression 47 which terminates at interior wall 33 of insert member 16 enables the front side 48 of shoulder seal member 17 to be positioned for preliminary sealing engagement with shoulder portion 13 upon manual threaded engagement of the insert member with the threaded portion of cell body 12. It will be appreciated that while this preliminary hand-tightened preliminary engagement of seal member 17 between insert member 16 and end cap 18 does seal cavity 11 up to about 1000 psi, it will not pressure seal the cavity under the 3000 psi to 6000 psi experienced by the cell under some solvent extraction techniques.

The interior surface 19 of end cap 18 includes an annular seal support portion 49 protruding outwardly in the direction of said cell body 12. Support portion 49 includes a relatively flat support surface 51 formed for support and sealing engagement with the seal backside 52. As viewed in FIGS. 5A and 5B, shoulder seal member 17 is sandwiched or positioned between insert member shoulder portion 13 and the end cap support surface as end cap 18 is displaced toward insert member 16 during operation (FIG. 5B).

Concentrically adjacent support portion 49 of the end cap interior surface 19 is an outer annular pocket portion 53 formed for sliding receipt of the insert member end surface 46 as external forces are applied to a distal exterior surface 54 of end cap 18. Accordingly, after engagement of the insert member mating threads 32 with the cell body threaded portion for preliminary sealing of cavity 11, subsequent external forces (illustrated by arrows 21 and 56 in FIG. 1 and applied by clamp devices 57, 57' to the outer periphery of end caps 18, 18' in the direction of the respective shoulder portions 13, 13') causes end caps 18, 18' to displace inwardly relative insert members 16, 16'. This displacement can be up to approximately fifty (50) thousandths of an inch.

The exterior wall 34 of insert member then slides linearly along the inner side wall 36 of end cap 18 as key members 38 engage guide slots 39 longitudinally therealong. Subsequently, end surface 46 of insert member 16 extends into pocket portion 53 causing support surface 51 to engage the seal member backside 52, which in turn compresses the seal member front side 48 against shoulder portion 13.

In the preferred embodiment of the present invention, shoulder portion 13 is beveled to concentrate the penetration of shoulder portion into seal member front side 48 (FIGS. 3, 5A and 5B). Similarly, support surface 51 of end cap 18 includes an annular rib portion 59 protruding the support surface to concentrate the penetration of a portion of support surface into seal member backside 52. Preferably, the apex of beveled shoulder portion 13 and annular rib portion 59 of support portion 49 are substantially vertically aligned to maximize sealing engagement therebetween.

These pressure concentrated areas on seal member enhance pressurized sealing so that pressure seals up to about 6000 psi are capable. It will be understood, however, that both the beveled shoulder portion 13 and the annular rib portion 59 are sufficiently blunt so as not to pierce or cut the shoulder seal member upon engagement therewith.

Referring back to FIG. 1, it is shown that two opposing delivery and retrieval fluid conduits 26, 26' provide fluid communication with cavity through respective nozzles 27, 27' for delivery of solvent and extraction of analyte therefrom. The distal exterior surface 54 of end cap 18 provides a preferably centrally positioned, relatively narrow orifice 22 (FIGS. 5A and 5B) extending therethrough for communication with cavity 11.

A bore portion 23 extends downwardly from exterior surface 54 which is co-axially aligned with orifice 22. FIGS. 5A and 5B, however, illustrate that bore portion 23 has a transverse cross-sectional dimension substantially greater than a transverse cross-sectional dimension of orifice 22. An upper portion of bore portion 23 tapers outwardly and away from orifice 22 forming tapered portion 61.

Seated at the bottom of bore portion 23 is an O-ring or torus-shaped nozzle seal member 24 disposed therein for sealing engagement with nozzle 27 of fluid conduit 26. Bore portion 23 includes an annular recessed portion 62 (FIGS. 3, 5A and 5B) formed for receipt and removable securement of nozzle seal member 24 therein.

As nozzle 27 of conduit member 26 is linearly inserted into bore portion 23 of the end cap in the direction of arrow 56, a tapered face 63 of nozzle 27 engages the tapered portion 61 of bore portion 23 (FIGS. 1, 5A and 5B). This self centering arrangement aligns the nozzle orifice (not shown) with the end cap orifice 22 for delivery or removal of fluids from cavity 11. It will be understood, however, that the angle of the tapered face is substantially similar to that of the bore tapered portion 61 to reduce or eliminate any wedging.

Nozzle 27 further includes a nipple portion 64 (FIG. 1) protruding therefrom to deform and simultaneously engage nozzle seal member 24 for pressurized sealing therewith. Nozzle seal member 24 is preferably of a material capable of cold forming to mirror the nipple shape of nipple portion 64 without flowing into and sealing orifice 22. The suitable material for the above mentioned purposes is preferably TEFLON® (polytetrafluoroethylene).

Accordingly, the opposing bore portions 23, 23' are centrally aligned so that upon insertion of the two opposing nozzles 27, 27' of conduits 26, 26', the extraction cell apparatus 10 will be centered thereon. This arrangement not only aligns the nozzle orifices with the respective end cap orifices, but provides a means for support and transportation of the extraction cells. Hence, the present invention is extremely suitable for automated operation. Especially in comparison to the prior art extraction cells which most often require threaded mounting to the conduit nozzle fixtures.

Moreover, the force applied in the opposite directions by conduit members 26 (approximately 120 lbs) is sufficient to engage both the shoulder seal members and the nozzle seal members for sealing engagement up to about 300–500 psi alone. The two pair of opposing external forces 21, 21' and 56, 56' (i.e., provided by opposing clamp devices 57, 57' and conduit members 26, 26'), however, cooperate to pressure seal cavity 11 during solvent extraction at the necessary elevated pressures and temperatures.

To filter the fluid flow to and from the cavity, and to provide a bed support for the sample, a frit or filter member 66 is provided in the end cap near the end cap orifice. As shown in FIG. 2 and 3, frit member 66 is disk shaped and positioned adjacent interior surface 19. Frit member 66 is received inside the socket provided by support portion 49 and positioning the frit member at an elevation substantially equal to support surface 51, but below annular rib portion 59. Accordingly, frit member 66 is situated between end cap orifice 22 and shoulder seal member 17 and will not interfere with the pressurized seal between the support surface and the shoulder portion.

FIG. 4 best illustrates that the interior surface of end cap 18 includes at least four radially spaced spacer members 67, as well as a circumferential spacer 68, to form a thin cylindrical chamber 69 between interior surface 19 and the frit member. These spacers are preferably integrally formed with the interior surface, and are formed to position frit member 66 away from orifice 22 a sufficient distance to enable the fluid to flow into chamber 69. This increases the surface area which enhances the flow of fluid through frit member 66.

In the preferred form, frit member 66 is provided by porous stainless steel. Other filter elements may suffice however. Further it will be appreciated that the end cap, the cell body and the insert member are preferably metallic in composition, and most preferably stainless steel. Other compositions, however, may be employed without departing from the true spirit and nature of the present invention.

In an alternative embodiment, as shown in FIG. 6, the external forces (arrows 21 and 56) applied by the conduit member and the clamp device (both not shown) may be exerted on insert member 16 rather than end cap 18. In this embodiment, end cap 18 is removably mounted to cell body 12, preferably through mating threads 32 formed in inner side wall 36.

As shown in FIG. 6, shoulder seal member 17 is press fit and mounted to insert member in a manner similar to the above-mentioned preferred embodiment, except that the seal member is mounted to a bottom portion thereof rather than the top portion. In this configuration, the frit member is sandwiched between an insert member interior surface 71 and nozzle seal member 24.

A top exterior surface 72 of insert member 16 provides the bore portion 23 and orifice 22 extending into cavity 11. Further, guide key members 38 and guide slots 39 are provided to enable relative displacement of insert member 16 relative end cap 18 along the direction of the longitudinal axis. Accordingly, after hand tightening of end cap 18 to cell body 12, engagement of a conduit member and a clamp device (not shown) to insert member 16 in the directions of arrows 21, 56, exert external forces on insert member 16 to increasingly seal shoulder seal member 17 against shoulder portion, and nozzle seal member 24 against the nozzle.

What is claimed is:

1. A fluid extraction cell apparatus comprising:

a pressure resistant vessel forming a cavity, and having at least one shoulder portion positioned at a distal end of said vessel to define an opening communicating with said cavity;

an insert member engaging said vessel proximate said shoulder portion for removable mounting thereto;

a seal member positioned proximate said insert member and having a front side positioned for contact with said shoulder portion upon mounting engagement of said insert member with said seal member;

an end cap formed for sliding cooperation with said insert member to enable an interior surface of said end cap to contact a backside of said seal member such that an exterior force applied to said end cap in an inwardly direction toward said shoulder portion causes increasing sealing contact between said seal member and said shoulder portion; and a securing device for securing said end cap to said insert member.

2. The extraction cell apparatus as defined in claim 1 further including:

a guide device, situated between said end cap and said insert member, enabling linear displacement of said end cap relative said insert member along a longitudinal axis thereof while further substantially preventing rotational displacement therebetween.

3. The extraction cell apparatus as defined in claim 2 wherein, said guide device includes a guide key member extending radially outward from said insert member, and a longitudinal guide slot provided in an inner side wall of said end cap, and formed and dimensioned for sliding engagement with said key member to provide said linear displacement.

4. The extraction cell apparatus as defined in claim 1 wherein, said insert member is annular having a threaded interior wall formed for threaded mating with an exterior wall of said pressure vessel.

5. The extraction cell apparatus as defined in claim 1 wherein, said interior surface of said end cap includes a seal support portion protruding therefrom toward said shoulder portion, and formed to sealingly engage the backside of said seal.

6. The extraction cell apparatus as defined in claim 5 wherein, said seal support portion is annular shaped having a relatively flat support surface for sealing engagement with the seal backside.

7. The extraction cell apparatus as defined in claim 6 wherein, said support surface is vertically aligned with said shoulder portion.

8. The extraction cell apparatus as defined in claim 6 wherein, said seal is deformable, and said support surface includes an annular rib portion protruding outwardly from said support surface and vertically aligned with said shoulder portion, said rib portion being sufficiently thin to cause said seal to deform thereto, and sufficiently blunt to prevent cutting of said seal.

9. The extraction cell apparatus as defined in claim 8 wherein, the pressure vessel shoulder portion is beveled such that an annular apex portion thereof is substantially in vertical alignment with said rib portion.

10. The extraction cell apparatus as defined in claim 1 wherein, said seal is removably mounted to said insert member.

11. The extraction cell apparatus as defined in claim 10 wherein, said insert member includes a depression in an end surface facing the end cap interior surface, and formed for sliding receipt of said seal therein.

12. The extraction cell apparatus as defined in claim 1 wherein, said seal is deformable.

13. The extraction cell apparatus as defined in claim 12 wherein, said seal is annular.

14. The extraction cell apparatus as defined in claim 1 wherein, said insert member includes a depression in an end surface facing the end cap interior surface, and formed for sliding receipt of said seal therein for positioning between said end cap and said insert member, and said interior surface of said end cap includes a pocket portion formed for sliding receipt of the insert member end surface therein to displace said end cap relative said insert member for said increasing sealing contact between said seal member and said shoulder portion.

15. The extraction cell apparatus as defined in claim 14 wherein, said end surface and said pocket portion are annular shaped.

16. The extraction cell apparatus as defined in claim 1 wherein, said end cap includes an orifice extending therethrough into said cavity for fluid communication therewith.

17. The extraction cell apparatus as defined in claim 1 wherein, said end cap includes a nozzle seal member positioned in said orifice and formed for engaging contact with a fluid conduit for sealing engagement therebetween.

18. The extraction cell apparatus as defined in claim 17 wherein, said pressure vessel includes a second orifice extending therethrough into said cavity for fluid flow through said cavity.

19. The extraction cell apparatus as defined in claim 18 wherein, said pressure vessel includes a vessel nozzle seal member positioned in said second orifice and formed for engaging contact with a second fluid conduit for sealing engagement therebetween.

20. The extraction cell apparatus as defined in claim 1 wherein,
said front side of said seal member is positioned to straddle said shoulder portion upon sealing engagement therewith.

21. A fluid extraction cell apparatus comprising:
a pressure resistant vessel forming a cavity, and having at least one shoulder portion defining an opening communicating with said cavity;
an insert member engaging said vessel proximate said shoulder portion for removable mounting thereto;
a shoulder seal member positioned proximate said insert member and having a front side positioned for contact with said shoulder portion upon mounting engagement of said insert member with said shoulder seal member;
an end cap formed for sliding receipt of said insert member therein until an interior surface of said end cap contacts a backside of said shoulder seal member, said end cap defining an orifice extending therethrough into said cavity, and a bore portion substantially coaxially aligned with said orifice and extending away from said cavity, said bore portion having a transverse cross-sectional dimension substantially larger than that of said orifice; and
a deformable nozzle seal member disposed in said bore portion for pressurized fluid passage through the orifice upon a conduit member having a nozzle simultaneously engaging said bore portion and said nozzle seal member in a direction towards said orifices to cooperate for pressurized sealing engagement therebetween, said simultaneous engagement further causing sealing engagement between said shoulder portion and said shoulder seal member.

22. The extraction cell apparatus as defined in claim 21 wherein,
an exterior force applied to said end cap in an inwardly direction toward said shoulder portion by a clamp device causes increasing sealing contact between said seal member and said shoulder portion.

23. The extraction cell apparatus as defined in claim 21 further including:
a guide device situated between said end cap and said insert member for linear displacement of said end cap relative said insert member.

24. The extraction cell apparatus as defined in claim 23 wherein,
said guide device includes a guide key member affixed to and extending radially outward from said insert member, and a longitudinal guide slot provided in an inner side wall of said end cap, and formed and dimensioned for sliding engagement with said key member to provide said linear displacement.

25. The extraction cell apparatus as defined in claim 21 wherein,
said insert member is annular having a threaded interior wall formed for threaded mating with an exterior wall of said pressure vessel.

26. The extraction cell apparatus as defined in claim 21 wherein,
said interior surface of said end cap includes a seal support portion protruding therefrom toward said shoulder portion, and formed to sealingly engage the backside of said seal.

27. The extraction cell apparatus as defined in claim 26 wherein,
said seal support portion is annular shaped having a relatively flat support surface for sealing engagement with the seal backside.

28. The extraction cell apparatus as defined in claim 27 wherein,
said seal is deformable, and
said support surface includes an annular rib portion protruding outwardly from said support surface and vertically aligned with said shoulder portion, said rib portion being sufficiently thin to cause said seal to deform thereto, and sufficiently blunt to prevent cutting of said seal.

29. The extraction cell apparatus as defined in claim 28 wherein,
the pressure vessel shoulder portion is beveled such that an annul apex portion thereof is substantially in vertical alignment with said rib portion.

30. The extraction cell apparatus as defined in claim 29 wherein,
said insert member includes a depression in an end surface facing the end cap interior surface, and formed for sliding receipt of said seal therein.

31. The extraction cell apparatus as defined in claim 21 wherein,
said insert member includes a depression in an end surface facing the end cap interior surface, and formed for sliding receipt of said seal therein for positioning between said end cap and said insert member, and
said interior surface of said end cap includes a pocket portion formed for sliding receipt of the insert member end surface therein to displace said end cap relative said insert member for said increasing sealing contact between said seal member and said shoulder portion.

32. The extraction cell apparatus as defined in claim 21 wherein,
said pressure vessel includes a second orifice at an opposite end thereof extending therethrough into said cavity, and a respective bore portion substantially coaxially aligned with said second orifice and extending away from said cavity, said respective bore portion having a transverse cross-sectional dimension substantially larger than said orifice; and
a second deformable nozzle seal member disposed in said respective bore portion for pressurized fluid passage through the orifice upon a pair of opposing fluid conduit members having nozzles simultaneously engaging respective bore portions and respective seal members in opposite directions towards the orifices which cooperate for pressurized sealing engagement therebetween.

33. The extraction cell apparatus as defined in claim 32 wherein,
each said bore portion further includes an annular recessed portion proximate the respective orifice, each said recessed portion being formed for receipt of the seal member therein.

34. The extraction cell apparatus as defined in claim 33 wherein, each said bore portion includes a tapered portion tapering outwardly and away from said respective orifice terminating at the exterior surfaces of a proximal of said pressure vessel and at a distal end of said end cap; and each nozzle of said fluid conduit member is tapered inwardly at an angle substantially similar to that of the bore tapered portions.

35. The extraction cell apparatus as defined in claim 34 further including:

a pair of frit members disposed in said cavity proximate each respective orifice to filter fluid flow to and from said cavity.

36. The extraction cell apparatus as defined in claim 35 wherein, each frit member is spaced from the termination of the respective orifice at said cavity a sufficient distance for dispersion of flow of fluid about said frit member.

* * * * *